United States Patent Office 3,104,255
Patented Sept. 17, 1963

3,104,255
TELOMERIZATION OF UNSATURATED HYDROCARBONS WITH ALKYLENE GLYCOL BORATES AND TELOMERIC PRODUCTS OBTAINED THEREBY
Donald D. Emrick, Shaker Heights, and Samuel M. Darling, Lyndhurst, Ohio, assignors to The Standard Oil Company, Cleveland, Ohio, a corporation of Ohio
No Drawing. Filed June 13, 1961, Ser. No. 116,697
Claims priority, application Canada June 16, 1960
18 Claims. (Cl. 260—462)

This invention relates to a process for the telomerization of certain unsaturated hydrocarbons with alkylene glycol borates, and more particularly to the telomerization of olefins, such as ethylene, with borates of α- and β-alkylene glycols in the presence of a free radical initiator, and to the novel telomers thereby obtained.

Large amounts of ethylene and propylene are available from petroleum refinery gases, or can be made readily on cracking hydrocarbons. Accordingly, any new process for utilizing these olefins would be commercially attractive.

Olefins undergo a reaction known as telomerization, which has been described in numerous patent specifications and other publications. This involves the reaction of the olefin, called a taxogen, with a fragment of another molecule, known as a telogen, and the product of this reaction is called a telomer. The reaction can be defined by the following equation:

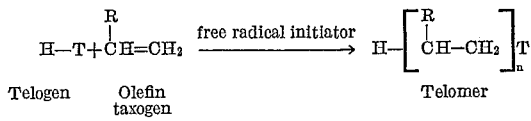

wherein R is a hydrogen atom or an alkyl, aryl, mixed alkyl aryl, mixed aryl alkyl, or cycloalkyl radical, and $n$ is a whole number greater than 1. Telomers are different from copolymers and interpolymers. Copolymers and interpolymers contain a number of each of two or more different monomer units in the main polymer chain, whereas the fragments of another molecule (the telogen) in telomers appear as units at the terminal of the main polymer chain. Telomerization also differs from simple free radical addition to the double bond of an olefin, in that more than one molecule of the olefin appears in the product. The telomerization reaction proceeds in the presence of a free radical initiator which removes an active hydrogen atom from the telogen. The resulting radical initiates the telomerization by adding to the double bond of the olefin. However, the hydrogen atoms of alkylene glycols do not function readily in the reaction mechanism and the alkylene glycols telomerize only with difficulty and only give poor yields.

In the process of the invention, certain unsaturated hydrocarbon taxogens are telomerized with an alkylene glycol borate telogen in the presence of a free radical initiator for the telomerization. The ease with which the alkylene glycol borates telomerize is surprising, in view of the difficulty with which the corresponding alkylene glycols telomerize.

The product is a novel telomer containing boron in the molecule in the form of an alkylene glycol borate end group.

The telogen is an alkylene glycol borate having a hydrogen atom, preferably tertiary, on at least one of the carbon atoms directly attached to oxygen, and can be defined by the following general formula:

(A)

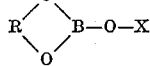

wherein X represents hydrogen or

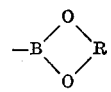

or

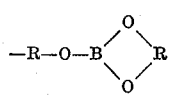

or $R_6$, and wherein R is an α- or β-alkylene radical, $R_6$ representing a monovalent hydrocarbon group such as an alkyl, aryl, mixed alkyl aryl, mixed aryl alkyl or cycloalkyl group having one to ten carbon atoms. The borate has a total of from about three and preferably from about four to about thirty carbon atoms.

It will be apparent from the foregoing that this formula can also be expressed in the following form:

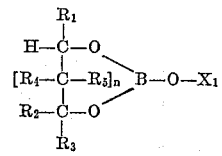

where $X_1$ is H, or $R_6$ or

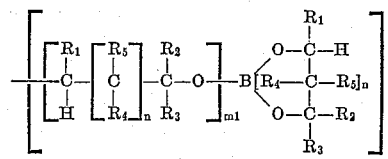

where $n$ is 0 or 1, and $m_1$ is 0 or 1.

Thus, the telogens are of two classes: the borates derived from α-alkylene glycols and the borates derived from β-alkylene glycols, and in each case the glycol can be combined with the boric acid residue in a ratio of 1:1, 2:2 or 3:2. The following specific groups of borates are within the class which can be used in accordance with the invention.

α-Alkylene glycol borates:

(I) (1) 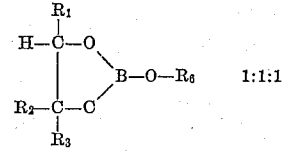
1:1:1

(2) 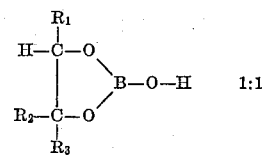
1:1

(3) 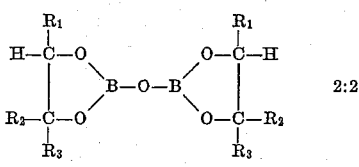
2:2

(4) 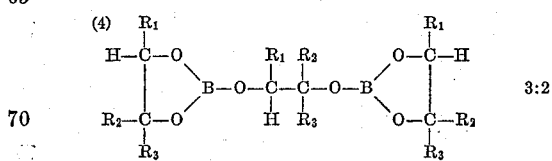
3:2

β-Alkylene glycol borates:

(II) (1) 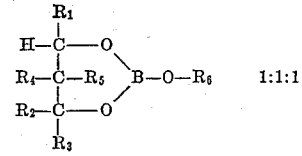 1:1:1

(2) 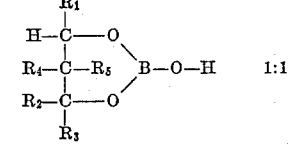 1:1

(3) 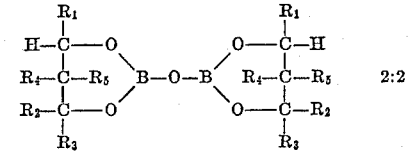 2:2

(4) 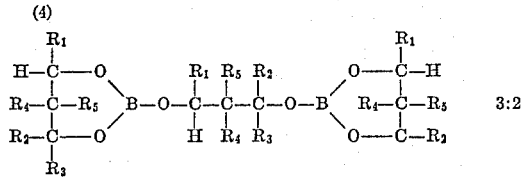 3:2

In the above formulae, $R_6$ is as in A above, and $R_1$, $R_2$, $R_3$, $R_4$ and $R_5$, which may be the same or different, represent hydrogen atoms or alkyl, aryl, mixed aryl alkyl, mixed alkyl aryl, or cycloalkyl groups each having from one to about ten carbon atoms, and preferably not having more than eight carbon atoms and being of a size and number such that the total number of carbon atoms in the alkylene glycol borate is from about three and preferably from about four to about thirty.

Since these borates can be formed from mixed glycols, $R_1$, $R_2$, $R_3$, $R_4$ and $R_5$ can differ in different parts of the molecule. The borate should be largely unpolymerized and compatible with hydrocarbons.

Typical $R_1$, $R_2$, $R_3$, $R_4$, $R_5$ and $R_6$ radicals are methyl, ethyl, n-propyl, isopropyl, n-butyl, isobutyl, secondary butyl, tertiary butyl, n-amyl, isoamyl, tertiary amyl, n-hexyl, isohexyl, 2-ethylhexyl, n-heptyl, tert-heptyl, n-octyl, isooctyl, tert-octyl, n-nonyl, tert-nonyl, n-decyl, tert-decyl, phenyl, xylyl, benzyl, β-phenylethyl, α-phenylethyl, tolyl, ethylphenyl, dimethylphenyl, cyclohexyl, methylcyclohexyl, cyclopentyl and cycloheptyl.

The following borates are examples of those which may be used in accordance with the invention:

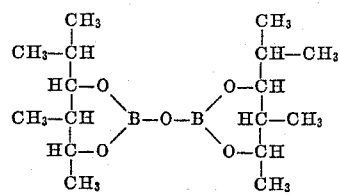

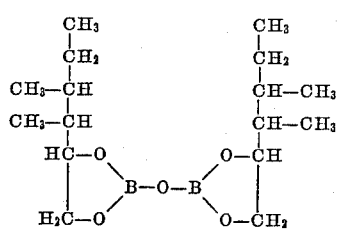

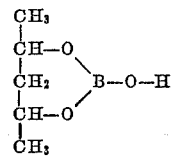
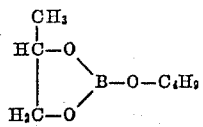
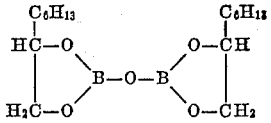
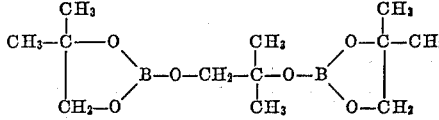
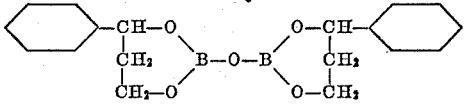
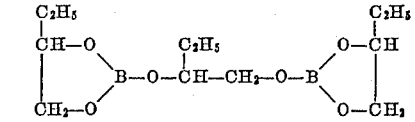
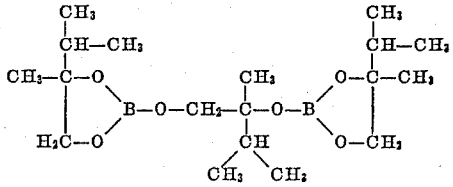
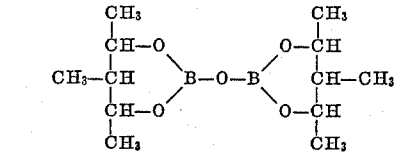
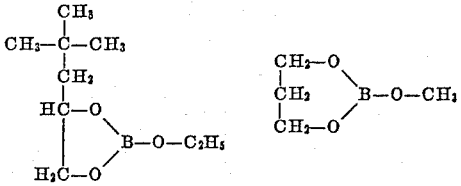
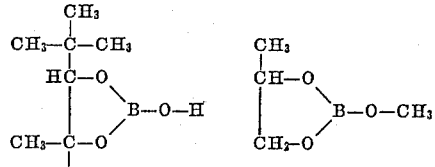
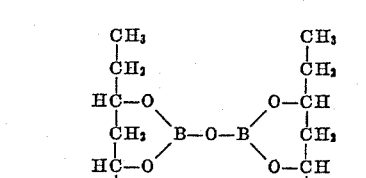
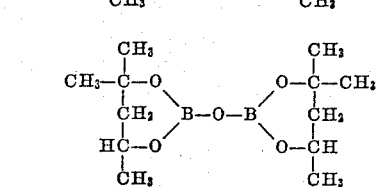

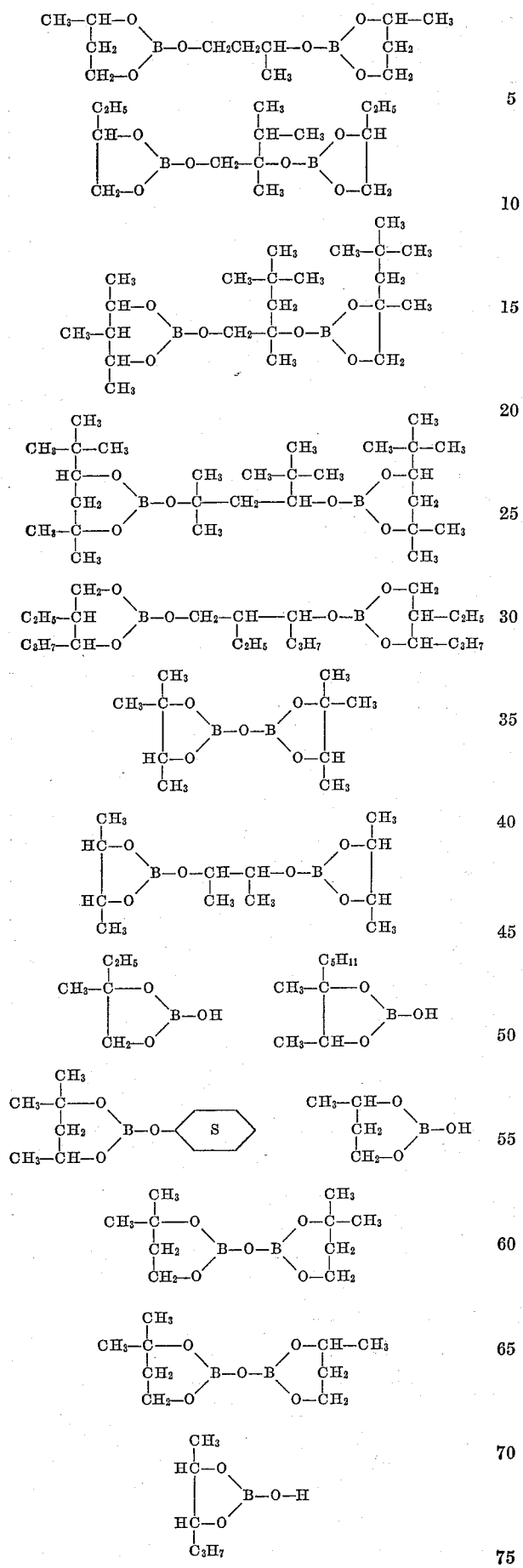

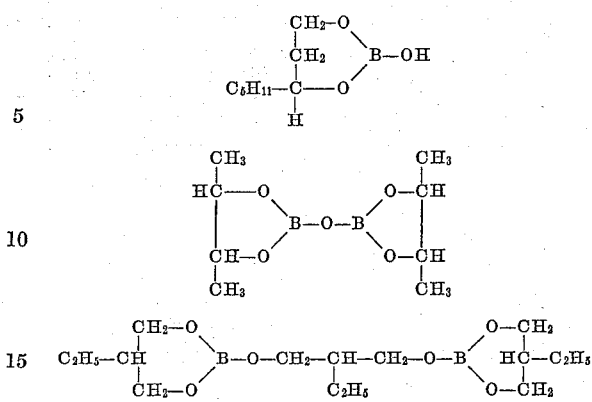

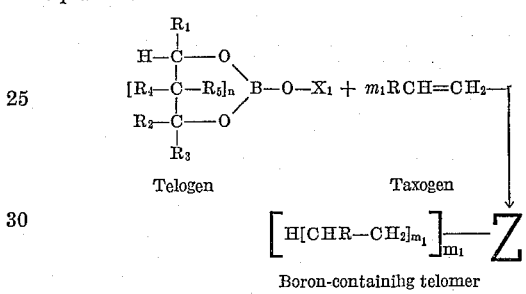

These alkylene glycol borates are believed to react with the unsaturated hydrocarbons according to the following equation:

$$\begin{matrix} & R_1 & \\ & | & \\ & H-C-O & \\ & | & \\ [R_4-C-R_5]_n & B-O-X_1 + m_1 RCH=CH_2 \\ & | & \\ & R_2-C-O & \\ & | & \\ & R_3 & \end{matrix}$$

Telogen        Taxogen $$\Big[H[CHR-CH_2]_{m_1}\Big]_{m_1} - Z$$

Boron-containing telomer

In the above formulae, $X_1$ is as defined heretofore or as in Formula B, $m_1$ is the number of moles of compound or unit noted and $m_2$ is the number of chains attached to the terminal group Z which is the α- or β-alkylene glycol borate residue, that is to say the compound of Formula B less the number of hydrogen atoms ($m_2$) that have been replaced.

R in the formula for the unsaturated hydrocarbon taxogen represents a hydrogen atoms or an alkyl, aryl, mixed alkyl aryl, mixed aryl alkyl, or cycloalkyl radical having from one to about sixteen carbon atoms, and preferably not more than eight carbon atoms. These are referred to for convenience hereinafter as α-olefins.

Typical R radicals, are phenyl, methyl, ethyl, isobutyl, n-hexyl, n-amyl, n-butyl, n-propyl, isopropyl, cyclohexyl, cyclopentyl, benzyl, methyl phenyl, ethyl phenyl, n-decyl, n-dodecyl n-tetradecyl, and methyl cyclohexyl.

The taxogen is preferably ethylene or a mixture of ethylene and one or more other α-olefins containing a major proportion of ethylene. The highly branched olefins such as isobutylene do not telomerize as readily under peroxide initiated free radical conditions and, therefore, although they may be used, are less desirable. α-Olefins higher than ethylene in molecular weight can be used alone, but react more slowly and produce lower conversions and yields than ethylene.

Telomers composed partially or wholly of higher taxogens such as propene, butene-1, pentene-1, 4-methyl-pentene-1, 3-methyl hexene-1, hexene-1, heptene-1, octene-1, decene-1, styrene and 8-p-menthene are of lower molecular weight and lower melting point than those obtained using ethylene alone or ethylene-rich mixtures under comparable conditions.

The reaction requires a free radical initiator.

Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; diaryl peroxides or diaralkyl peroxides such as dicumyl peroxide, perhalogen compounds, such as hexachloroethane, and combinations thereof with dialkyl peroxides, organometallic compounds such as tetraethyl lead and tetraphenyl lead; and azo-N-N-compounds such as azobis (isobutyronitrile) and diazoaminobenzene.

Di-tert-butyl peroxide and α-dicumyl peroxide are preferred free radical initiators for use in the process of this invention. The stability of free radical initiators is customarily evaluated in terms of half-life at a stated temperature, and the following table compares this for several commercially available free radical initiators:

TABLE I

| Compound | Temp. (° C.) | Half life (hours) | Number of moles of radical produced per pound |
|---|---|---|---|
| (1) Tetraethyl lead | | | 5.62 |
| (2) Lauroyl peroxide | 50 | 54.2 | 2.27 |
| | 70 | 3.4 | |
| | 85 | 0.5 | |
| (3) Dicumyl peroxide | 115 | 12.4 | 3.34 |
| | 130 | 1.8 | |
| | 145 | 0.38 | |
| (4) Di-t-butyl peroxide | 100 | 218 | 6.20 |
| | 115 | 34 | |
| | 130 | 6.4 | |
| | 145 | 1.4 | |
| | 160 | 0.24 | |
| (5) Benzoyl peroxide | 70 | 13.0 | 3.74 |
| | 85 | 2.15 | |
| | 100 | 0.40 | |
| (6) 2,4-dichlorobenzoyl peroxide | 50 | 17.8 | 2.38 |
| | 70 | 1.41 | |
| | 85 | 0.25 | |
| (7) Azobis (isobutyronitrile) | 80 | 1.26 | 5.50 |

In general, the half-life of the free radical initator employed should, at the reaction temperature, be within the range of from about 0.01 to about 10 hours, since such initiators have been found to give the best results. By suitable modification of the reaction conditions, however, it is possible to employ free radical initiators whose half-life is outside this range.

The reaction conditions can be widely varied. The preferred reaction temperature is established by the temperature at which the free radical initiator decomposes to give a rapid liberation of a substantial amount of free radicals within the above-stated range for half-life. For di-tertiary-butyl peroxide, for example, as the table shows, the preferred reaction temperatures are within the range of from 125° to 195° C. Lauroyl peroxide, on the other hand, can be used at temperatures of from 65° to 120° C. At reaction temperatures below this, the reaction time tends to be quite long because of the slower evolution of free radicals. Higher temperatures may be wasteful unless strict incremental addition of the free radical initiator is used, since the free radical initiator may be decomposed at a higher rate than can be utilized in the telomerization, so that the free radicals will be lost and therefore wasted. In general, for heat-decomposable free radical initiators, reaction temperatures within the range of from 40° to 200° C. are useful.

If the boiling point of the unsaturated hydrocarbon is low, it is necessary to operate under pressure.

If the free radical initiator is decomposable by radiation, such as by ultraviolet rays, such radiation can be used, and it may then be unnecessary to heat the reaction mixture above room temperature. Azo-bis-(cyclohexane nitrile) and azo-bis-(isobutyronitrile) are initiators of this type, and in fact the latter initiator could be used to effect telomerization at temperatures below 0° C.

If the reactants are liquids at the reaction temperature, no solvent is necessary unless dilution is desired to maintain control of the reaction rate. However, a solvent for the unsaturated hydrocarbons will assist in bringing it into contact with the telogen, and it may be possible by virtue of such facilitation of the reaction to use less olefin in the reaction mixture. A solvent may also be desirable when the telogen is a solid in order to increase the reaction rate.

Any such solvent should be inert under the telomerization reaction conditions. Suitable solvents include benzene, cyclohexane, n-heptane, n-octane and iso-octane. Preferably, the reaction mixture is agitated.

The reaction is exothermic, and requires careful control to prevent the temperature from rising so high that free radical initiator decomposition becomes too rapid.

The reaction time will depend upon the initiator and the reactants, the concentrations thereof, and the reaction temperature. It is usually convenient to employ reaction conditions such that the reaction can be completed in a time as short as one hour. Reaction times as long as fifty hours, however, may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature permitted by the decomposition temperature of the free radical initiator, so as to obtain a slow evolution of free radicals, but such a reaction will require a long time to complete. For example, ethylene charged at an initial pressure of approximately 2000 p.s.i.g., at reaction temperatures of 130 to 140° C., using 2-methylpentanediol-2,4 borate, produces telomers having average molecular weights of about 1000 to about 2000. At an initial charge pressure of 5000 p.s.i.g., at reaction temperatures of 135 to 140° C., flexible plastic telomers having average molecular weights of 5000 to 11,000, with flow points of 85 to 130° C. are produced. The same effect may be obtainable by incorporating an inert diluent which is a good solvent for the unsaturated hydrocarbon.

The reaction is easily carried out in conventional pressure equipment. The reactants are introduced in any convenient order, and the equipment brought to the reaction conditions desired. The free radical initiator preferably is added incrementally in order to achieve high utilization with higher attendant telogen conversions.

The ingredients may be brought together in any order but preferably the alkylene glycol borate, the unsaturated hydrocarbon, and the solvent, if one is employed, are first mixed together and the free radical initiator is then added incrementally. If the unsaturated hydrocarbon is a gas, such as ethylene, the reaction vessel may be run at a constant olefin gas pressure throughout the reaction during the addition of the free radical initiator. In this manner, greater telogen conversions may be obtained together with the production of telomers of a more uniform average molecular weight distribution.

A continuous reaction is of particular interest in a commerical process. This is readily effected by suitable equipment which permits continuous blending of the alkylene glycol borate with the olefin and free radical initiators, holding them in a pressurized reaction chamber in which they have a dwell time equivalent to that required to complete the reaction, and then drawing them off to a working-up chamber where the solvent is removed and the residue recovered.

Boron-containing telomer products having a wide range of molecular weights which vary according to the reactants, reaction conditions and concentration of reactants are obtainable. The boron content is important to the desirable and in many respects unique properties of these telomers. In the unpyrolyzed telomers, the higher the boron content, within the obtainable ranges, the more distinctive are the properties of the telomer. Usually, the boron content will be within the range from about 0.01 to about 5.5% by weight, and the molecular weight can range from as low as 200 to considerably beyond 30,000, depending primarily on the pressure of the taxogen. The boron content of the low molecular weight materials is higher than that of the higher molecular weight materials because the proportion of polyolefin largely determines molecular weight. The low molecular weight materials, i.e., those having average cryoscopic molecular weights of from about 200 to about 750 and boron contents of from about 0.6 to about 5.5% have properties characteristic of low molecular weight, and are viscous oils or soft solids, soluble in benzene. The medium molecular weight materials having solution viscosity molecular weights of from about 1,000 to about 12,000 and boron contents of from about 0.03 to about 0.6 acquire the properties of a polymeric or resinous material, generally are insoluble in benzene, particularly when the molecular weight is above about 1500, and are waxes, the hardness, flexibility and toughness of which increase further with molecular weight. The high molecular weight materials having solution viscosity molecular weights in excess of 12,000 and a boron content of from 0.01 to about 0.06% are tough plastic resins.

The telogen used also affects the molecular weight of the telomer obtained, but not to such a great extent as the pressure of the taxogen. The effect of two different telogens on molecular weight, namely, bis(2-methylpentanediol-2,4) diborate, and bis (butanediol-1,3) diborate, with ethylene as the taxogen, is shown in the following table:

TABLE II

| Telogen | Pressure, p.s.i. | Temp., °C. | Solution viscosity molecular weight of telomer |
| --- | --- | --- | --- |
| Bis (2-methyl-pentanediol-2,4) diborate | 3,000 | 130 | 5,000 |
| Do | 4,000 | 130 | 8,000 |
| Do | 10,000 | 130 | 12,000 |
| Bis (butanediol-1,3) diborate | 3,000 | 130 | 3,500 |
| Do | 4,000 | 130 | 6,200 |
| Do | 10,000 | 130 | 11,500 |

The different telogens also affect the densities of the telomers. For example, typical waxy and resinous telomer products from bis (2-methylpentanediol-2,4) diborate have densities of from about 0.905 to about 0.930 g./ml., and typical waxy and resinous telomers from bis (butanediol-1,3) diborate have densities of from about 0.925 to about 0.960 g./ml.

The different telogens differ somewhat in their chain terminating properties. Bis (2-methylpentanediol-2,4) diborate is somewhat less active as a chain terminating agent in telomerization than bis (butanediol-1,3) diborate. This can be seen from the following table:

TABLE III

| Active compound | Active compound/ D.T.B.P. molar ratio [1] | Range of reaction temp., °C. | Moles of telomer product produced per mole D.T.B.P. |
| --- | --- | --- | --- |
| Bis (2-methyl-pentanediol-2,4) diborate | 93 | 145 | 5 – 8 |
| Bis (butane-diol-1,3) diborate | 93 | 145 | 8 – 15 |
| Do | 21 | 135 | 1.9– 2.3 |
| Do | 21 | 155 | 4.4– 6.0 |

[1] All of D.T.B.P. fed initially rather than incrementally.

The chain terminating ability of a given telogen approximately triples with each 20° C. rise in reaction temperature, as is evident from the above data. It also increases with pressure, and the mole ratio of telogen to peroxide present.

The following examples are illustrative of the process and product of the invention.

In these examples, the following procedure was used to determine the boron content of the high molecular weight telomer borates obtained:

A two gram sample of the telomer borate was accurately weighed out into a 100 ml. round-bottomed flask. Five grams of mannitol were added, followed by 20 mls. of ethylene glycol and 10 mls. of glycerol. The flask was fitted with a reflux condenser and refluxed for 15 minutes. The resulting mixture was cooled and the inside of the condenser washed down with distilled water. Three drops of dilute alcoholic phenolphthalein acid-base indicator were then added, and the mixture quickly titrated in the same flask to a pink endpoint with standard sodium hydroxide solution. By subtracting the value of a blank determined under these same conditions, good results can be obtained for samples containing even only small quantities of boron, by the equation:

$$\text{Grams boron} = (\text{mls. base}) \times (\text{normality of base}) \times (0.01082)$$

The molecular weight of the telomer borates was obtained from simple calculations derived from their boron content, from the viscosity of their solutions, or cryoscopically. Unless otherwise stated in the examples, the viscosity method was used.

The viscosity method used was the Erchak method described in United States patent specification No. 2,712,534. The viscosities were determined according to ASTM-D-445-53T, and the viscosimeter tubes calibrated accordingly. Fine bore Ostwald viscosimeter tubes were used, heated in an insulated constant temperature bath, filled with medium white mineral oil. The viscosities at two concentrations of the telomer in p-xylene at 115.15° C. were used to obtain graphical estimates of the intrinsic and specific viscosity at the lower levels of concentration required for this estimation. These values permitted the calculation of estimated molecular weights using the Erchak equation, and this is referred to herein as solution viscosity or viscosity molecular weight. These values are roughly equivalent to the molecular weights obtained by the use of the Harris viscosity equation—which is referred to hereinafter as Harris viscosity molecular weight (J. Polymer Sci., 8, 353 (1952)).

*Example 1*

A one-gallon capacity autoclave of the Magne-Dash type, provided with means for heating it externally, a cooling coil for cooling it internally, and a stirrer, was pressure sealed and evacuated of air. A solution of 428 g. of substantially pure bis (2-methyl-pentane-diol-2,4) diborate (2:2) and 25 g. of di-tert-butyl peroxide dissolved in 382 g. of pure benzene was drawn into the evacuated autoclave and the autoclave flushed with nitrogen. U.S.P. grade ethylene gas was then passed into the autoclave to produce an equilibrium pressure of 780 p.s.i.g. at 15° C. The reaction mixture was then heated with agitation to a temperature of 130° C. (pressure 2310 p.s.i.g.) over a period of one hour, and then cautiously maintained at 132° to 158° C. for 13 hours reaction time.

During the initial phases of the reaction, it was necessary to cool the reaction mixture to maintain control. After 45 minutes the reaction was more than 60% complete. At the conclusion of the reaction time, the pressure was 450 p.s.i.g. at 127° C. The vessel was cooled, the unreacted ethylene vented off, and the benzene solvent distilled off, whereupon 928 g. of a solid material was obtained.

This was thoroughly macerated with benzene at 20° to 30° C. and extracted with excess benzene. 269 g. of a benzene-insoluble telomer remained. This material was a tough, elastic plastic, having a boron content of 0.281% and an average molecular weight, determined by the viscosity method, of 4360. From the benzene extract was recovered 294 g. of methanol-insoluble benzene-soluble telomer having a cryoscopic average molecular weight of 1435.

Example 2

In a 250 ml. autoclave of the type described in Example 1 was placed a solution of 45.2 g. of bis (2-methyl-pentanediol-2,4) diborate (2:2) and 2.5 g. of di-tert-butyl peroxide, dissolved in 45 g. of pure benzene. The contents were flushed with nitrogen and ethylene gas was introduced to an initial pressure at 129° C. of 2930 p.s.i.g. over a period of 1 hour and then cautiously maintained at 128° to 142° C. for a period of 13 hours. It was necessary to cool the reaction mixture during the initial phases to keep the reaction under control. The pressure at the end of the reaction was 100 p.s.i.g. at 24° C. The vessel was cooled, the unreacted ethylene was vented off and the solvent distilled, whereupon 110 g. of crude solvent-free product was obtained.

The product was thoroughly macerated with benzene at room temperature (20° to 30° C.) and extracted with excess benzene. 30.8 g. of benzene-insoluble telomer was obtained as a residue. This telomer contained 0.362% boron. The molecular weight determined by the viscosity method was 5320.

Evaporation of the benzene from the benzene-soluble fraction, followed by water extraction to remove the water-soluble bis (2-methyl-pentanediol-2,4) diborate, yielded 26.6 g. of benzene-soluble telomer having a cryoscopic average molecular weight of 882. This product was in the form of a soft solid, in contrast to the benzene-insoluble fraction which was a tough elastic plastic.

Example 3

Example 2 was repeated, using the same amounts of glycol diborate and di-tert-butyl peroxide, but reducing the initial pressure of ethylene at the start of the reaction at 132° C. to 2200 p.s.i.g. The temperature of the reaction was maintained at from 128° C. to 138° C. and at the conclusion of the reaction the ethylene pressure at 24° C. was 100 p.s.i.g. 101 g. of solvent-free crude product was obtained, and this by extraction with benzene was fractionated into 54.2 g. of benzene-soluble telomer and 13.1 g. of benzene-insoluble telomer. The latter contained 0.0731% boron and had a viscosity average molecular weight of 3290. The benzene-soluble material was a soft solid, and the benzene-insoluble material was a tough, elastic plastic.

Example 4

Example 2 was repeated, using the same amount of glycol diborate and di-tert-butyl peroxide. The initial ethylene pressure was 2160 p.s.i.g. at 134° to 143° C., and the final ethylene pressure at 22° C. was 120 p.s.i.g. 94 g. of a crude solvent-free product was obtained, and this was fractionated with benzene into 47 g. of benzene-soluble telomer, a soft solid having a cryoscopic molecular weight of 498, and 49.2 g. of elastic, tough benzene-insoluble telomer containing 0.455% boron and having a molecular weight by the viscosity method of 4210.

Example 5

A solution containing 90.6 g. of bis (2-methyl-pentanediol-2,4) diborate (2:2) and 5 g. of di-tert-butyl peroxide dissolved in 90 g. of benzene was drawn into a 500 ml. autoclave of the type described in Example 1. The contents were flushed with nitrogen, and ethylene gas introduced to an initial pressure at 123° C. of 2020 p.s.i.g. The reaction mixture was then cautiously maintained at 138° to 146° C. for 13 hours. The pressure at the end of the reaction was 300 p.s.i.g. at 139.5° C. The autoclave was cooled and the unreacted ethylene vented off, after which the benzene solvent was distilled. 148 g. of solvent-free crude material was obtained. This was thoroughly macerated with benzene at room temperature and filter-extracted with excess benzene, leaving 40.5 g. of benzene insoluble telomer. This was a tough elastic plastic which had a molecular weight by the viscosity method of 5320. The benzene soluble fraction yielded 71 g. of a soft solid having a cryoscopic molecular weight of 752.

Example 6

Example 5 was repeated, employing 91.5 g. of the diborate and 5.1 g. of the di-tert-butyl peroxide. The initial ethylene pressure was 2090 p.s.i.g. at 99° C. and the reaction temperature was held at 129° to 140° C. The final ethylene pressure was 625 p.s.i.g. at 152° C. 190 g. of solvent-free crude product was obtained, and this was separated by benzene extraction into 58 g. of benzene-soluble telomer and 40 g. of acetone-reprecipitated benzene-insoluble telomer containing 0.1205% boron and having a viscosity molecular weight of 3090. The benzene-soluble material was a soft solid, and the benzene-insoluble material was a tough elastic plastic.

Example 7

This example shows the effect of a high ethylene concentration, and should be compared with Example 8, which follows.

Example 5 was repeated, using 93.5 g. of the diborate and 5.1 g. of di-tert-butyl peroxide. The initial ethylene pressure was 5800 p.s.i.g. at 107° C. The reaction was carried out at from 121° to 137° C. The final ethylene pressure at 132° C. was 220 p.s.i.g. 230 g. of solvent-free crude product was obtained, and this was separated by benzene extraction into 47 g. of a soft benzene-soluble telomer and 80 g. of hard, tough, benzene-insoluble telomer containing 0.0671% boron and having a molecular weight by the viscosity method of 13,300.

Example 8

Example 7 was repeated, using the same quantities of diborate and di-tert-butyl peroxide, but a considerably lower proportion of ethylene. The initial ethylene pressure at 113° C. was 2190 p.s.i.g. The reaction was carried out at 121 to 148° C., and the final ethylene pressure was 390 p.s.i.g. at 147° C. 166 g. of solvent-free crude product was obtained, and separated by benzene extraction into 49 g. of benzene-soluble telomer and 51 g. of benzene-insoluble telomer containing 0.1772% boron and having a molecular weight by boron analysis of 6110. The benzene-soluble material was a soft solid, and the benzene-insoluble material a tough elastic plastic. The flow point (bulb method) of the benzene-insoluble telomer was 83.5 to 87.0° C.

Example 9

This example also illustrates the effect of a high ethylene concentration.

Example 7 was repeated, this time increasing the initial ethylene pressure to 5940 p.s.i.g. at 115.5° C. The reaction was carried out at 121° to 141° C., and at the conclusion of the reaction the ethylene pressure was 220 p.s.i.g. at 141° C. 230 g. of a solvent-free crude product was recovered, and this was separated by benzene extraction into 41 g. of benzene-soluble telomer and 92 g. of benzene-insoluble telomer. The former material was a soft solid, and the latter, after reprecipitation from acetone, was a tough hard plastic having a boron content of 0.0667% and an average molecular weight by the viscosity method of 5250.

Example 10

A solution of 56.1 g. of bis (2-methyl-pentane-diol-2,4) diborate (2:2) and 3.5 g. of di-tert-butyl peroxide dissolved in 56 g. of pure benzene was drawn into a 250 ml. evacuated autoclave of the type described in Example 1. The contents were flushed with nitrogen and U.S.P. ethylene gas was introduced. The contents were heated with agitation to 117° C. (pressure 4780 p.s.i.g.) over a period of 1 hour and then cautiously maintained at from 130° to 152° C. for 13 hours. The reaction was kept under control by circulating cool water through the cooling coils.

At the conclusion of the reaction, the ethylene pressure was 1400 p.s.i.g. at 133° C. The vessel was cooled, unreacted ethylene was vented off, and the benzene solvent was then distilled away. 117 g. of crude solvent-free product was obtained. This was thoroughly macerated with benzene at room temperature and filter-extracted with excess benzene to produce 62 grams of benzene-insoluble telomer containing 0.0528% boron and having a viscosity molecular weight of 4570. This was a tough, hard plastic having a flow point (bulb method) of 89.0° to 89.5° C. The benzene-soluble telomer weighed approximately 30 g. and was a soft solid.

*Example 11*

46 g. of 2-methyl pentanediol-2,4 borate (1:1) and 2.5 g. of di-tert-butyl peroxide were dissolved in 46 g. of pure benzene. This solution was placed in a 250 ml. capacity Magne-Dash autoclave. The autoclave was flushed with and pressure-treated with nitrogen, after which the nitrogen was cautiously released. Gaseous U.S.P. ethylene was then charged into the vessel to a pressure of 2750 p.s.i.g. at 128° C. The reaction was continued at 132° to 154° C. for 8 hours. At the conclusion of the reaction, the ethylene pressure was 210 p.s.i.g. at 146° C. The vessel was cooled and the unreacted ethylene vented off, after which the benzene was distilled. 103 g. of benzene-free product was obtained. Fractionation with benzene as set forth above yielded 36.9 g. of benzene-insoluble telomer and 39.3 g. of benzene-soluble telomer. The latter had a cryoscopic molecular weight of 1007 and was an elastic wax. The benzene-insoluble telomer contained 0.0965% boron and had a molecular weight by the viscosity method of 7340.

*Example 12*

Example 11 was repeated, substituting a 500 ml. capacity autoclave and using 92 g. of the borate, 5 g. of di-tert-butyl peroxide and 80.9 g. of pure benzene. The initial ethylene pressure at 137° C. was 4960 p.s.i.g. The reaction was carried out at from 133° to 149° C. for 9 hours. At the conclusion of the reaction the ethylene pressure was 340 p.s.i.g. at 135° C. After cooling, venting the ethylene and distilling off the benzene, 207 g. of solvent-free crude product were obtained. The product was extracted with benzene and the benzene extract discarded. 103 g. of benzene-insoluble telomer remained, containing 0.0851% of boron and having a molecular weight by the viscosity method of 7,230. The material was a tough, hard plastic.

*Example 13*

Example 12 was repeated, but using an initial ethylene pressure at 132° C. of 3310 p.s.i.g. and maintaining the reaction at from 136° to 144° C. for 8 hours. The final reaction pressure was 590 p.s.i.g. at 164° C. 168 g. of crude solvent-free product were obtained, and this after extraction with benzene was reduced to 53 g. of acetone-reprecipitated benzene-insoluble telomer having a boron content of 0.1216% and a molecular weight by the viscosity method of 4,470. The material was a tough, hard plastic.

*Example 14*

Example 12 was repeated, but using only 86.8 g. of the borate. The initial ethylene pressure was 3180 p.s.i.g. at 127° C. The reaction was carried out at 132° to 149° C. for 8 hours. The final ethylene pressure was 390 p.s.i.g. at 145° C. 160 g. of a solvent-free crude product were obtained, and this was reduced by benzene extraction to 32 g. of tough, elastic acetone-reprecipitated benzene-insoluble telomer containing 0.0971% boron and having a molecular weight by the viscosity method of 3310.

*Example 15*

Example 14 was repeated, but using an initial ethylene pressure of 2160 p.s.i.g. at 132° C. The reaction was carried out at 135° to 141° C. for 9 hours. The final ethylene pressure was 590 p.s.i.g. at 139° C. After benzene extraction, 13.3 g. of a tough, elastic benzene-insoluble telomer containing 0.192% boron were obtained, having a flow point (bulb method) of 83.5° to 87.5° C., and having a molecular weight of 2980 by the viscosity method.

*Example 16*

This example and the next example illustrate solventless reactions.

90.6 g. of bis (2-methyl-pentanediol-2,4) diborate (2:2) and 5 g. of di-tert-butyl peroxide were drawn into a 500 ml. capacity autoclave of the type described in Example 1. The autoclave was flushed and pressure-tested with nitrogen. After venting off the nitrogen, the autoclave was charged with sufficient U.S.P. grade ethylene gas to develop a pressure of 3080 p.s.i.g. at 124° C. The contents were heated up to, and maintained at a temperature of from 137° to 144° C. for 3 hours. The final ethylene pressure at 103° C. was 290 p.s.i.g. 214 g. of crude product were obtained. Extraction with excess benzene at room temperature yielded 104 g. of a soft benzene-soluble telomer and 77 g. of elastic, tough benzene-insoluble telomer. The molecular weight of the benzene-insoluble telomer by the viscosity method was found to be 5000.

*Example 17*

Example 16 was repeated, but using an initial ethylene pressure of 4760 p.s.i.g. at 114° C. The reaction temperature was held at from 119° to 145° C. The final ethylene pressure was 1200 p.s.i.g. at 113° C. 192 g. of crude product were obtained, which product was reduced by benzene extraction to 45 g. of tough, elastic, acetone-reprecipitated benzene-insoluble telomer containing 0.0971% boron and having a molecular weight of 3720 by the viscosity method. The benzene extract was discarded.

*Example 18*

128.6 g. of bis (2-methyl-pentanediol-2,4) diborate and 0.35 g. di-tert-butyl peroxide were dissolved in 25 g. of benzene. This solution was placed in an autoclave which was flushed with and pressure-tested with nitrogen, after which the nitrogen was released. Gaseous ethylene was then charged into the autoclave until the initial pressure was 16,000 p.s.i.g. at 130° C. The reaction was continued for 2.2 hours at 130° C.±5° C. At the conclusion of the reaction the final pressure was 4500 p.s.i.g. at 130° C. The vessel was cooled, the unreacted ethylene vented and the benzene removed by distillation. Of the ethylene charged 45% was converted. The products consisted of 99 g. of a toluene-insoluble fraction and 1 g. of a toluene-soluble acetone-insoluble fraction.

The acetone-reprecipitated toluene-insoluble fraction contained 0.033% boron. It had a solution viscosity molecular weight of 12,100, a density of 0.925 g./ml., a melt index of 10 g./10 minutes at 125° C., an ultimate tensile strength of 1600 p.s.i., an ultimate elongation of 66% and a Shore-D hardness of 55.

*Example 19*

This example shows the effect of solvent and pressure on Example 16.

Example 16 was repeated, but using an amount of benzene equal to twice the weight of telogen, that is, 180 g. The initial ethylene pressure was increased to 6380 p.s.i.g. at 130° C. The reaction was carried out at from 127° to 144° C., and the final ethylene pressure was 180 p.s.i.g. at 147° C. The weight of solvent-free crude product was 223 g., and from this material there was obtained by benzene extraction 41 g. of benzene-soluble telomer having a cryoscopic average molecular weight of 348 and a benzene-insoluble telomer having a boron content of 0.250% and a flow point (bulb method) of 86.5° to 89.0° C.

*Example 20*

This example should be compared with Example 17, to observe the effect of solvent on the reaction.

Example 16 was repeated, but using a 250 ml. autoclave and 56.1 g. of the alkylene glycol borate, 3.4 g. of di-tert-butyl peroxide and 110 g. of benzene. The initial ethylene pressure was 4660 p.s.i.g. at 129° C. and the reaction was carried out while maintaining the temperature within the range of from 129° to 155° C. The final ethylene pressure was 790 p.s.i.g. at 144° C. 130 g. of solvent-free crude product were obtained, and this was reduced by benzene extraction to 66 g. of soft benzene-soluble telomer and 39 g. of hard, tough acetone-reprecipitated benzene-insoluble telomer containing 0.0536% boron, having a flow point (bulb method) of 90.50 to 93.5° C., and a molecular weight by the viscosity method of 4020.

*Example 21*

A solution was made up containing 52 g. of bis (butanediol-1,3) diborate (2:2), 2.5 g. of di-tert-butyl peroxide and 52 g. of benzene. This solution was drawn into a 250 ml. evacuated autoclave as described heretofore, and the autoclave was flushed with, and pressure-tested with nitrogen, after which the nitrogen was cautiously released. Sufficient U.S.P. grade ethylene gas was then charged into the vessel to produce a pressure of 3480 p.s.i.g. at 134° C. Reaction was carried out for a total of 16 hours while maintaining the temperature within the range of from 133° to 163° C., cooling water being circulated through the cooling coils to maintain the temperature in the early part of the reaction. The final ethylene pressure was 90 p.s.i.g. at 161° C. Upon cooling, venting off unreacted ethylene and removing benzene solvent, 113 g. of solvent-free crude product were obtained. This was separated by benzene extraction into 48 g. of benzene-soluble telomer wax having an average viscosity molecular weight of 1250, and 19 g. of elastic, tough benzene-insoluble telomer having an average molecular weight by the viscosity method of 8830.

*Example 22*

A solution was made up containing 339 g. of bis-(butanediol-1,3) diborate, 2.5 g. of di-tert-butyl peroxide and 382 g. of benzene. The solution was placed in a one-gallon autoclave, as described heretofore, and the autoclave flushed with, and pressure-tested with nitrogen, after which the nitrogen was released. The autoclave was then charged with ethylene to an initial pressure of 4800 p.s.i.g. at 130° C. The reaction was carried out while maintaining a temperature of 130° C.±3° C. for 18 hours. The final ethylene pressure was 800 p.s.i.g. at 130° C. Upon cooling and venting of the unreacted ethylene and removing the benzene solvent, it was ascertained that 53% of the ethylene was converted and 537.5 g. of solvent-free crude product were obtained. This was separated by toluene extraction to provide 11.5 g. of a toluene-soluble, acetone-insoluble fraction and 526 g. of a toluene-insoluble fraction. The main product, i.e., the toluene-insoluble fraction, after reprecipitation with acetone contained 0.200% boron. It had a solution viscosity molecular weight of 2750, a density of 0.930 g./ml., an ultimate tensile strength of 1560 p.s.i., an ultimate elongation of 10%, and a Shore-D hardness of 58. The product was especially adapted as an additive for paraffin wax which is useful, for example, for coating paper and milk cartons and for preparing wax-coated corrugated board.

*Example 23*

Into a 500 ml. capacity Magne-Dash autoclave was drawn a solution in 45 g. of benzene of 45 g. of tris(butanediol-1,3) diborate (3:2) and 2.5 g. of di-tert-butyl peroxide. The autoclave was flushed with, and pressure-tested with nitrogen, after which the nitrogen was cautiously released. Sufficient gaseous U.S.P. grade ethylene was then charged into the vessel to produce a pressure of 3050 p.s.i.g. at 132° C. The reaction was conducted at 134° to 142° C. for 16 hours. The final ethylene pressure was 590 p.s.i.g. at 138° C. 101 g. of solvent-free crude product were obtained, which was separated by benzene extraction into 29 g. of waxy, benzene-soluble telomer having a molecular weight of 1386 and 47 g. of benzene-insoluble telomer containing 0.1751% boron and having a molecular weight of 1440 calculated from the boron content and assuming one boron atom in the molecule.

*Example 24*

Example 23 was repeated, but employing 82.2 g. of tris (butanediol-1,3) diborate (3:2), 5 g. of di-tert-butyl peroxide and 74 g. of pure benzene. Sufficient U.S.P. grade ethylene was charged into the autoclave to product an initial pressure of 4850 p.s.i.g. at 129.5° C. The mixture was heated at a temperature between 129° and 137° C. for 16 hours. The autoclave was then cooled to 12° C. (final ethylene pressure 625 p.s.i.g.) and unreacted ethylene was vented off. 149 g. of solvent-free crude product were obtained. This was fractionated by benzene extraction into 49 g. of soft benzene-soluble telomer having a cryoscopic average molecular weight of 611, and 30 g. of tough, elastic benzene-insoluble telomer containing 0.2302% boron. The molecular weight by the viscosity method was 1810. The product had a flow point (bulb method) of 93.5° to 95.5° C.

*Example 25*

Example 23 was repeated, but substituting 41 g. of the tris (butanediol-1,3,) diborate and twice the amount of benzene, namely 82 g. The initial ethylene pressure at 139° C. was 4200 p.s.i.g. The reaction temperature was held at from 130° C. to 143° C., and the final ethylene pressure was 100 p.s.i.g. at 21° C. 103 g. of crude product were obtained, and this was fractioned by benzene extraction into 30 g. of waxy, benzene-soluble telomer having a cryoscopic average molecular weight of 1433, and 24 g. of tough, elastic benzene-insoluble telomer containing 0.0845% boron. The flow point of the benzene-insoluble telomer was 92.5° to 94.5° C.

*Example 26*

A three-necked 1000 ml. capacity flask was provided with a mechanical stirrer and reflux condenser, and was heated externally by means of an oil bath. A mixture of 210 g. of n-decene-1 and 185 g. of tris (2-methyl-pentanediol-2,4) diborate (3:2) was placed in a reaction flask. The contents were heated to 140° to 150° C., and 17.5 g. of di-tert-butyl peroxide were added over a period of 15 minutes. The reaction mixture was then heated within the range of 140° to 150° C. for an additional 10 hours.

*Example 27*

Into an 800 ml. flask fitted with a reflux condenser was placed 260 g. of tris (2-ethyl-hexanediol-1,3) diborate (3:2) and 193 g. of n-octene-1. The mixture was heated to 125° C., the reflux temperature, and 30.6 g. of di-tert-butyl peroxide was added over a period of about 1 hour. Refluxing at a temperature within the range of from 125° to 130° C. was continued for an additional 50 hours. This reaction product was used in Example 46.

*Example 28*

Into a 500 ml. capacity Magne-Dash autoclave was placed 90.8 g. of bis (2-methyl-pentanediol-2,4) diborate (2:2), 5 g. of di-tert-butyl peroxide, 80.9 g. of pure benzene and 16.3 g. of freshly distilled uninhibited styrene. The autoclave was flushed with, and pressure tested with nitrogen, after which the nitrogen was cautiously released.

Sufficient U.S.P. grade ethylene gas was then charged into the vessel to produce a pressure of 6050 p.s.i.g. at 136° C. The reaction temperature was maintained at 136° to 156° C. for 2 hours (final pressure 2300 p.s.i.g. at 152° C.) and for 14 more hours at 145° C. to 152° C. The final ethylene pressure was 940 p.s.i.g. at 145° C. The reaction mixture was cooled, and unreacted gaseous ethylene vented off. After removal of the solvent, 200 g. of a tacky solvent-free wax were obtained. Nearly all of the styrene-ethylene cotelomer was soluble in warm benzene. A portion of the telomer produced a solid adduct with urea in a mixture of methanol and methyl isobutyl ketone. This fraction displayed very strong aromatic absorption bonds in the infra-red, confirming the occurrence of a true cotelomerization.

*Example 29*

Into a 250 ml. capacity Magne-Dash autoclave was placed 54 grams of bis (2,3-butanediol) diborate (2:2), 2.5 g. of di-tert-butyl peroxide, and 44 g. of pure benzene. The autoclave was flushed with, and pressure-tested with nitrogen, after which the nitrogen was released. Sufficient U.S.P. grade ethylene has then charged into the vessel to produce a pressure of 1100 p.s.i.g. at 135° C. The reaction temperature was maintained at 140° to 150° C. for four hours. The final ethylene pressure was 530 p.s.i.g. at 140° C. The reaction mixture was cooled and the unreacted gaseous ethylene vented off. After removal of the benzene solvent, 71 g. of tacky material were obtained. Nearly all of the product was soluble in cold benzene or toluene, 33 g. being precipitated by methanol. The methanol-insoluble fraction had a cryoscopic molecular weight of 1010 and contained 0.83% boron.

*Example 30*

This example was conducted in the same manner as Example 29 but at a somewhat higher initial ethylene pressure, namely 4200 p.s.i.g. at 135° C. The reaction was run at 133° to 143° C. for four hours, the final pressure being 870 p.s.i.g. at 133° C. Upon cooling the reaction mixture and venting off the unreacted gaseous ethylene, 70 g. of solvent-free material were obtained. Benzene extraction of the latter yielded 14.4 g. of a benzene-insoluble fraction having a molecular weight of 1400, and 26.4 g. of a benzene-soluble, methanol-insoluble fraction having a cryoscopic molecular weight of 1100 and containing 0.57 percent of boron.

*Example 31*

99 g. of bis(2-methyl-pentanediol-2,4) diborate, 88 g. of benzene and 9.2 g. of di-alpha-cumyl peroxide were placed in a 500 ml. capacity Magne-Dash autoclave. After purging the autoclave and its contents of air by means of nitrogen, it was pressured with gaseous ethylene. The reactants were heated and maintained at a temperature of 250° to 277° F. for a period of 6 hours, the initial pressure of 1800 p.s.i.g. decreasing to 530 p.s.i.g. After the release of the unreacted ethylene and evaporation of the benzene solvent, 205 g. of solvent-free crude product were obtained, from which 30 g. of benzene-insoluble fraction (analyzing 0.114% boron) and 52 g. of benzene-soluble methanol-insoluble fraction were isolated.

*Example 32*

Into a 500 ml. capacity Magne-Dash autoclave were placed 113 g. of bis (1,3-butanediol) diborate, 88 g. of benzene and 10.2 g. of di-alpha-cumyl peroxide. The autoclave contents were purged of air as in Example 31 and pressured with ethylene. The reaction was conducted at a temperature of 255° to 280° F. for a period of 3 hours, the pressure falling from an initial ethylene pressure of 1300 p.s.i.g. to 500 p.s.i.g. during this period. After removal of the unreacted ethylene and the benzene solvent, 160 g. of solvent-free crude product were obtained. From this there was fractionated 4 g. of a benzene-insoluble product and 46 g. of a benzene-soluble methanol-insoluble product.

*Example 33*

A series of telomers was prepared using bis (2-methylpentanediol-2,4) diborate and bis (butanediol-1,3) diborate respectively as the telogen and ethylene as the taxogen. The reaction was carried out at a temperature of 130° C. in benzene as the solvent and with a 20:100 molar ratio of telogen to free radical initiator. The properties of the products after acetone reprecipitation are shown in the following table:

TABLE IV

| Telogen | Percent boron after acetone reprecipitation | Harris viscosity molecular weight | Density | Melt index, g./10 min. at temp. | Tensile strength, p.s.i. | Ultimate elongation, percent | Shore-D hardness |
| --- | --- | --- | --- | --- | --- | --- | --- |
| Bis (2-methylpentanediol-2,4) diborate | 0.082 | 4,830 | 0.915 | 13 at 100° C | (¹) | (¹) | (¹) |
| Do | 0.046 | 7,890 | 0.931 | 74 at 125° C | 1,630 | 60 | (¹) |
| Do | 0.053 | 6,900 | 0.920 | 130 at 125° C | 1,530 | 50 | 57 |
| Do | 0.033 | 12,100 | 0.925 | 10 at 125° C | 1,600 | 66 | 55 |
| Bis (butanediol-1,3) diborate | 0.200 | 2,750 | 0.930 | (¹) | 1,100 | 10 | 54 |
| Do | 0.254 | 3,240 | 0.943 | (¹) | 1,560 | 10 | 58 |
| Do | 0.062 | 6,660 | 0.935 | 40 at 125° C | 1,960 | 50 | 60 |

¹ Not measured.

*Example 34*

A series of telomers similar to those of Example 33 was converted into unsupported films and the moisture-vapour permeability of these films was determined. The film thickness in each instance was 4 mils and the moisture-vapour pressure differential in each instance was 53 mm. The results are shown in the following table:

TABLE V

| Telomer type film | Harris viscosity, mol. weight | Moisture-vapour permeability grams/m.²/ 24 hrs. |
| --- | --- | --- |
| Bis (2-methylpentanediol-2,4) diborate | 6,300 | 7.3 |
| Do | 11,600 | 3.1 |
| Bis (butanediol-1,3) diborate | 2,200 | 4.7 |

*Example 35*

A series of telomer films similar to those in Example 34 was studied to determine their gas transmission rates and the results are shown in the following table:

TABLE VI

| Telomer type | Density | Harris viscosity molecular weight | Film thickness, mils | Transmission rate,[1] (cc. gas (S.T.P.)/100 in.²/24 hrs. at 1 atm.) | |
|---|---|---|---|---|---|
| | | | | O₂ | N₂ |
| Bis (2-methylpentanediol-2,4) diborate | 0.925 | 12,100 | 8.3 | 19.4 | 4.4 |
| Do | 0.931 | 7,890 | 10.4 | 15.6 | 4.9 |
| Bis (butanediol-1,3) diborate | 0.943 | 3,240 | 8.4 | 11.2 | 3.9 |
| Do | 0.935 | 6,660 | 8.8 | 9.7 | 2.8 |

[1] A.S.T.M. D-1434-58.

*Examples 36 to 42*

A series of telomers were prepared having the consistency of petrolatum or thick oil, employing bis (1,3-butanediol) diborate and ethylene. The diborate, benzene, if used, and ditertiary-butyl peroxide in the weight ratios noted in Table VII were placed in a Magne-Dash autoclave. After purging the autoclave and its contents of air by means of nitrogen, it was pressured with gaseous ethylene to the pressure noted in Table VII. The reactants were heated and maintained at a temperature of 130° to 150° C. for a period of six hours. In Examples 36 and 39 no solvent was used and in Example 42, the solvent was iso-octane instead of benzene. The weight of product, the number of moles of product, and the cryoscopic molecular weights of the product are given in the table.

TABLE VII

| Ex. No. | C₂H₄ pressure, p.s.i. | Weight telogen | Weight D.T.B.P. | Weight solvent | Weight product/ weight D.T.B.P. | Moles product/ moles D.T.B.P. | Molecular weight |
|---|---|---|---|---|---|---|---|
| 36 | 1,000 | 22 | 1 | 0 | 5.6 | 3.0 | 275 |
| 37 | 1,200 | 43 | 1 | 115 | 31.7 | 10.4 | 445 |
| 38 | 1,000 | 43 | 1 | 57 | 25.2 | 6.4 | 579 |
| 39 | 950 | 44 | 1 | 0 | 9.3 | 3.7 | 318 |
| 40 | 750 | 11 | 1 | 29 | 14.9 | 3.0 | 721 |
| 41 | 975 | 11 | 1 | 15 | 10.8 | 2.5 | 640 |
| 42 | 870 | 23 | 1 | ¹11 | 12.3 | 2.3 | 780 |

¹ Iso-octane.

All of the products obtained in this procedure had a viscosity corresponding to thick oils or petrolatum. In the course of the work up, the 2:2 borate starting material was hydrolyzed to a 1:1 borate unit in the telomer.

It is apparent from the data that the higher the ethylene pressure, the higher the molecular weight of the product, and the higher the conversion, per mole of ditertiary butyl peroxide.

*Example 43*

This example and the following Example 44 are illustrative of a continuous telomerization, using bis (1,3-butanediol) diborate and ethylene.

The bis-diborate, pure benzene and di-tert-butyl peroxide were put in the mixing tank of the system which also included, in sequence from the mixer, an autoclave and a distilling or fractionating tower. The mixture was brought to a temperature of 285° to 310° F. This mixture was then fed into the autoclave reaction vessel, already pressured with ethylene to a pressure of 600 p.s.i.g. This vessel had a capacity of 1 liter. The reactant mixture was fed into the autoclave incrementally, and a corresponding proportion of reaction mixture interdrawn, at such a rate that the average dwell time was 3¾ hours, and over a period of 7½ hours, a total of 739 grams of the diborate, 575 grams of benzene and 25.4 grams of di-tert-butyl peroxide had passed through the reactor. From this proportion of starting materials, 1731 grams of crude product were obtained. From this there was fractionated 389 grams of a telomer-soluble product having a molecular weight of 508. This product has the consistency of a very thick oil.

*Example 44*

A continuous telomerization was carried out employing a reaction mixture in the proportion of 710 grams of bis (1,3-butanediol) diborate, 552 grams of pure benzene and 24.5 grams of di-tert-butyl peroxide. This amount of reactants was fed through a 1 liter autoclave reactor vessel over a period of 7 hours, as in Example 43, such that the average dwell time of the reaction mixture in the autoclave was 3½ hours. The reaction temperature was kept at 275° to 285° F., and the ethylene pressure at 600 p.s.i. The reaction product was withdrawn incrementally, and the reactant mixture added in corresponding increments. 1514 grams of crude product was obtained from this amount of starting materials, and this when fractionated yielded 237 grams of a telomer-soluble product having a molecular weight of 548. This material had the consistency of a very thick oil.

The reactivity of the borate units imparts very useful chemical properties, and a variety of derivatives may be formed.

Reaction with dilute alkaline reagents within the range of from 10° C. to 120° C. removes the boron from the cyclic borate units, producing hydroxyl groups, with the result that unusual long chain α- and β-glycols can be obtained via the telomerization reaction. Because of the greater reactivity of the alkylene glycol borates in telomerization, and the ease of hydrolysis of the borate, this is a better route to these glycols than is the direct telomerization of the glycol. The following examples illustrate this procedure.

*Example 45*

The mixture obtained as in Example 26 was cooled and then deborated by heating at 100° C. with 1500 g. of alkaline mannitol solution (0.05 g. of mannitol and 0.159 g. of NaOH/cc.) for ½ hour. The combined phases from this treatment were extracted with an excess of chloroform. Distillation of the combined chloroform layers produced 141 g. of an oil, 147 g. of recovered 2-methyl-pentanediol-2,4 and 98 g. of recovered n-decene-1. The telomer-derived oil had a viscosity of 104.96 cs. at 100° F. and 13.09 cs. at 210° F., and a viscosity index of 122.

*Example 46*

The mixture obtained as in Example 27 was cooled and then deborated by heating at 100° C. with 2000 g. of alkaline mannitol solution (0.05 g. of mannitol and 0.159 g. of NaOH/cc.) for ½ hour. The combined phases from this treatment were extracted with an excess of chloroform. Distillation of the combined layers produced 161 g. of an oil, 214 g. of recovered 2-ethyl-hexanediol-1,3 and 53 g. of n-octene-1. The telomer-derived oil had a viscosity of 271.1 cs. at 100° C. and 221.2 cs. at 210° C., and a viscosity index of 108.

These glycols are themselves susceptible of many reactions, because of the presence of the hydroxyl groups. They may, for example, be reacted with isocyanates or polyisocyanates, such as toluene-2,4-diisocyanate, to produce urethane or polyurethane resins of much higher melting point.

The following example illustrates this reaction:

Example 47

The telomer of Example 41, having a molecular weight of 640, was refluxed with a 10% sodium hydroxide solution for one hour. The glycol resulting therefrom was a thick oil which was broken up and washed thoroughly with saturated sodium chloride solution to remove the alkali, and then dried. The glycol (molecular weight 631) was reacted with an equimolar amount of toluene-2,4-diisocyanate. This was accomplished by heating the glycol at a temperature of 100° C. and stirring into it 20% by weight of anhydrous pyridine as a reaction medium and promoter. The toluene-2,4-diisocyanate was gradually poured into the mixture with stirring over a period of 10 minutes. The mixture was maintained, whilst stirring, at a temperature of 100° C. for one hour, and the temperature was then gradually increased over a period of one-half hour to 150° C., during which time the pyridine was removed by vaporization and the reaction product became a pasty mass. At this stage, the pasty mass was packed into a mold, and the mold was then heated for a period of one-half hour to increase the temperature gradually to 170° C. The final product was a solid, infusible resin.

Removal of the hydroxyl groups of the telomers of the invention by dehydration will produce long chain, probably conjugated, dienes.

The following example illustrates this reaction:

Example 48

The telomer of Example 1, having a molecular weight of 3852, was refluxed with 20% hydrochloric acid for one hour. The resulting mixture was poured into crushed ice and the resulting solids broken up and washed free of acid with water. After drying, the solid was a tacky, translucent resin of wax-like appearance. Infra-red analysis confirmed the presence of the diene linage and the absence of OH groups. These dienes are susceptible to further polymerization or cross-linking by procedures used for modifying isoprene and butadiene rubbers to produce complex resins.

The glycol may also be oxidized by heat-induced controlled air oxidation to produce high melting or nearly infusible and insoluble resinous materials.

The glycols will also react with organic acids, acid chlorides and acid anhydrides to form monomeric and polymeric esters, depending upon whether the acid reactant is monocarboxylic or polycarboxylic. Dicarboxylic acids form linear thermoplastic polymers and tri- and higher polycarboxylic acids form cage type or thermosetting polymers. These esters contain two ester groups with one or more long chain telomeric units, and constitute interesting alkyl-type and polyterephthalate ester-type polymers.

The borate group of the telomers of this invention which contain two tertiary oxygens can also be decomposed with the elimination of boron at temperatures in excess of 300° F. to form long chain, probably conjugated, dienes which can then be dimerized, polymerized and cross-linked as noted above. Such telomers containing two tertiary oxygens, when heated above 300° F. to pyrolyse them, give products that are intermediate in properties between linear polyethylene and synthetic elastomers. These heat modified materials display greatly enhanced clarity in films, greater than conventional or linear polyethylenes of the same thickness. It is frequently possible to prepare perfectly transparent films of such heat modified materials without resort to special annealing treatments. These resinous materials can be made to have a melting point above 330° F., temperatures nearly 100° F. higher than those of the best linear polyethylene.

Such heat-treated cross-linked products can be made to melt as high as or higher than isotactic polypropylene, and are in addition more elastic and flexible.

The boron-containing telomers of the invention, as the general formula shows, possess a polyhydrocarbon portion and a terminal alkylene glycol borate portion. As a result, they have most attractive properties, both chemical and physical.

The polyhydrocarbon portion of the telomer, according to its molecular weight and the nature of the olefin used, controls the melting properties of the telomers which vary from a liquid through a wax and to a synthetic resin. The alkylene borate unit or the diene or diene polymeric unit derived from pyrolysis of certain of these telomers modifies the polymer considerably so that, compared with a polymer such as polyethylene of like molecular weight, higher elasticity and flexibility, as well as better metal-bonding properties, are evidenced. These modifications are responsible for improved and, in many cases, unique use properties.

The liquid and oily telomers are useful as lubricants for textiles, machinery and internal combustion and jet engines, as lubricant and fuel additives to supply boron, and as hydraulic fluids. They adhere to glass.

The waxy telomers are useful as waxes in the formulation of polishes, candles, carbon paper, crayons, matches and printing inks. The resinous materials are thermoplastic and can be used in coating compositions, hot melts, rubber compounding, and wire cable and pipe covering. When used to coat regenerated cellulose film, for example cellulose film (such as that known as cellophane), the heat-seal-peel strength is greatly increased, and the moisture permeability is greatly decreased. Both waxes and resins can be blended with polyethylene and/or paraffin wax and the blends can be used in coating compositions for paper and paper containers, for example, milk cartons.

For example, ordinary crystalline paraffin wax (90%) with a solidification point of 52° C. and a hardness corresponding to a penetration of about 2.8 mm., was blended with 10% of a waxy product in accordance with this invention having a flow point of 92.5 to 94.5° C.

The wax blend has been found very suitable in viscosity, flexibility, and toughness for coating paper by, for example, the hot dip method. Films from bis (2-methylpentanediol-2,4) diborate telomers are more transparent than polyethylene films of the same thickness.

The telomers produced from ethylene and 2-methylpentanediol-2,4 borates are quite elastic and flexible, and have much better bonding properties than conventional polyethylenes of the same molecular weight range. This is especially true when the telomers are heated. Adhesion to metal is strong, which renders them suitable for aluminum foil laminates. These bonding properties are associated with the less crystalline and more rubbery or elastomeric character of such telomers, as contrasted to harder low molecular weight polyethylenes, which are generally more crystalline. The same glycol borates with higher α-olefins produce softer, lower melting products or even oils.

The improvement in adhesion mentioned earlier, and an increase in molecular weight, toughness and strength as a result of heating, is a consequence of the reactions described in the previous paragraph, especially the formation of dienes and polymerization.

The boron-containing higher molecular weight telomers can also be spun as fibers from melts thereof. Depending on the temperature used, there may be some borate elimination during spinning with an increase in strength.

This application is a continuation-in-part of Serial No. 821,111, filed June 18, 1959, now abandoned.

We claim:

1. An olefin telomer containing in the molecule an alkylene glycol borate unit having from about three to about thirty carbon atoms and having a molecular weight in excess of 1000.

2. An olefin telomer containing in the molecule an α-alkylene glycol borate unit having from about three to about thirty carbon atoms and having a molecular weight in excess of 1000.

3. An olefin telomer containing in the molecule a β-alkylene glycol borate unit having from about three to about thirty carbon atoms and having a molecular weight in excess of 1000.

4. An olefin telomer containing in the molecule a butylene glycol borate unit and having a molecular weight in excess of 1000.

5. An olefin telomer containing in the molecule a hexylene glycol borate unit and having a molecular weight in excess of 1000.

6. An olefin telomer containing in the molecule an octylene glycol borate unit and having a molecular weight in excess of 1000.

7. An ethylene telomer containing in the molecule an alkylene glycol borate unit having from about three to about thirty carbon atoms and having a molecular weight in excess of 1000.

8. A cotelomer of at least two olefins containing an alkylene glycol borate unit in the molecule and having a molecular weight in excess of 1000.

9. A cotelomer of at least two olefins containing in the molecule an alkylene glycol borate unit having from about three to about thirty carbon atoms and having a molecular weight in excess of 1000.

10. An olefin telomer containing an alkylene glycol borate unit in the molecule and having a boron content of from about 0.03 to about 0.6% by weight and having a molecular weight in excess of 1000.

11. An olefin-alkylene glycol borate reaction product containing boron in the molecule and having a boron content of from about 0.01 to about 0.06% by weight and having a molecular weight in excess of 1000.

12. A process for producing boron-containing olefin telomers which comprises telomerizing an α-olefin taxogen having from about two to about twelve carbon atoms in the molecule with an alkylene glycol borate having from about three to about thirty carbon atoms in the molecule in the presence of a free radical initiator capable of initiating the telomerization at a temperature at which an evolution of free radicals from the initiator is obtained.

13. A process in accordance with claim 12 in which the temperature is within the range from 40 to 200° C.

14. A process in accordance with claim 12 in which the α-olefin is ethylene.

15. A process in accordance with claim 12 in which the α-olefin is a mixture of ethylene and a second α-olefin, the ethylene being present in a major proportion.

16. A process in accordance with claim 12 in which the free radical initiator is a dialkyl peroxide.

17. A process in accordance with claim 12 in which the telogen is an α-alkylene glycol borate.

18. A process in accordance with claim 12 in which the telogen is a β-alkylene glycol borate.

References Cited in the file of this patent

UNITED STATES PATENTS

| | | |
|---|---|---|
| 2,160,917 | Shoemaker et al. | June 6, 1939 |
| 2,413,718 | Lincoln et al. | Jan. 7, 1947 |
| 2,423,497 | Harmon | July 8, 1947 |